F. & V. J. ROBERTS.

HOSE COUPLING FOR AIR BRAKES.

APPLICATION FILED JAN. 10, 1912.

Reissued Dec. 30, 1913.

13,666.

2 SHEETS—SHEET 1.

Witnesses.

J. Watson

Chas. W. Miller

Inventors.

Francis & Vernon John Roberts

By Baldwin & Rayward

Attorneys.

COLUMBIA PLANOGRAPH CO., WASHINGTON, D. C.

F. & V. J. ROBERTS.

HOSE COUPLING FOR AIR BRAKES.

APPLICATION FILED OCT. 24, 1910.

13,666

Reissued Dec. 30, 1913

2 SHEETS—SHEET 2.

Witnesses:

C. S. Brown

W. C. Bender

Inventors:

Francis Roberts

Vernon J. Roberts by Foster Freeman Watson & Coit

Attys

THE MORRIS PETERS CO., WASHINGTON, D. C.

UNITED STATES PATENT OFFICE.

FRANCIS ROBERTS AND VERNON JOHN ROBERTS, OF AUCKLAND, NEW ZEALAND.

HOSE-COUPLING FOR AIR-BRAKES.

13,666. Specification of Reissued Letters Patent. Reissued Dec. 30, 1913.

Original No. 985,551, dated February 28, 1911, Serial No. 588,687. Application for reissue filed January 10, 1912. Serial No. 670,510.

*To all whom it may concern:*

Be it known that we, FRANCIS ROBERTS and VERNON JOHN ROBERTS, citizens of the Dominion of New Zealand, and residing at Kimberley Road, Epsom, Auckland, in the Provincial District of Auckland, New Zealand, and Melford street, Ponsonby, Auckland, aforesaid, respectively, have invented certain new and useful Improvements in Hose-Couplings for Air-Brakes, of which the following is a specification.

Our invention relates to improvements in hose couplings of air brakes; and the objects of our improvements are to provide a plug in each coupling which when fully coupled has a port in the plug brought into communication with air ports of a cylinder, whereby air passes from the train pipe to the cylinder and a piston therein is operated to allow air to flow from the train pipe through both hoses and their couplings. The disengaging of the couplings, by being dragged apart, leaves the couplings open, allows air to escape from the train pipe and thereby actuate the brakes throughout. These objects are attained by mechanism illustrated in the accompanying drawings in which:—

Figure 1:
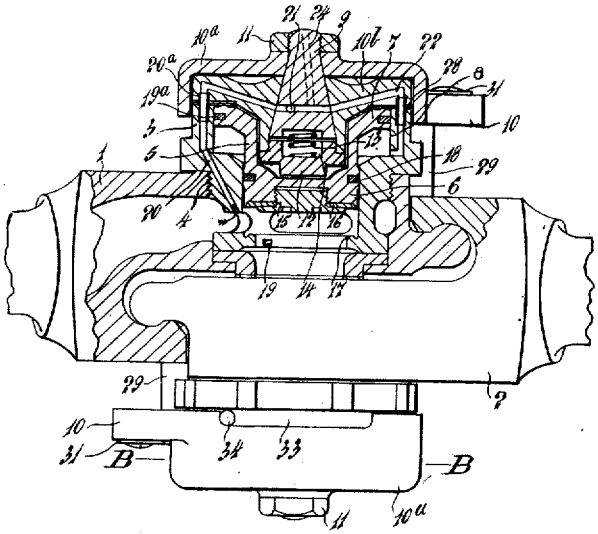
Figure 2:
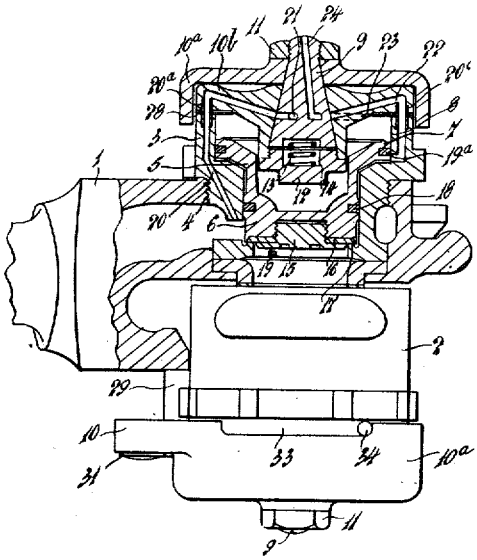
Figure 3:
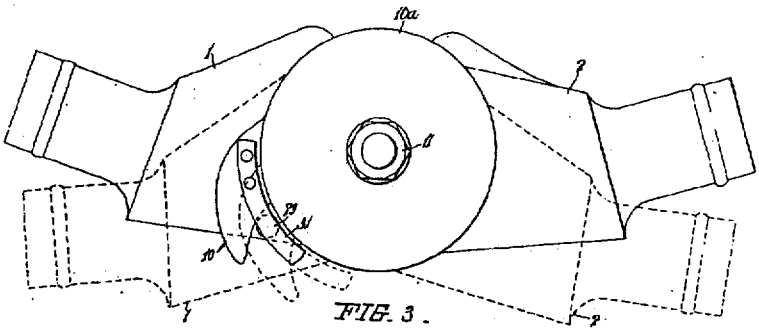
Figure 4:
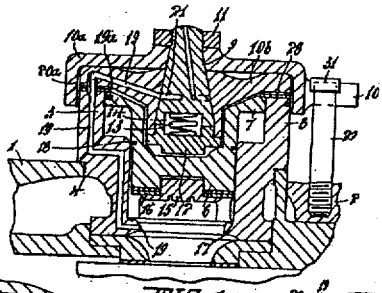

Figure 1 is a plan partly in section showing the hose couplings connected together. Fig. 2 another plan partly in section showing the couplings ready for connecting. Fig. 3 a side elevation of two couplings embodying the invention. Fig. 4, a part sectional plan on line A—A, Fig. 5. Figs. 5, 6, 7 and 8 are sectional elevations on line B—B, Fig. 1, and showing the plug in different positions.

The couplings 1 and 2 are those commonly used upon Westinghouse brake pipes. A cylinder 3 screws into each coupling at 4, and is provided with a piston 5 having a trunk 6 and head 7, the said head working in an enlargement 8 of the cylinder. A plug 9 fitting a corresponding hole in the upper end of the cylinder is adapted to be turned by a handle 10, and is secured in position by a nut 11. The handle is formed into a cap $10^a$ to protect the head $10^b$ of the cylinder. A cap 12 screws into the cylinder head, and a spring 13 in compression within a recess 14 formed in the base of the plug and in the cap 12 tends to keep the plug in its seat. A screw cap 15 secures washers 16 forming a valve face in position upon the lower end of the trunk 6, and this valve face, when the couplings are closed as shown in Fig. 2, rests upon a seat 17 at the bottom of the cylinder. Expansion rings 18 and $19^a$ make joints between the piston 5 and the cylinder 3, and a ring or gasket $20^a$ makes a joint between the said cylinder and its head $10^b$.

Figure 5:
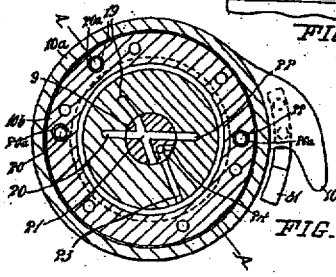

When the couplings 1 and 2 are connected as shown in Figs. 1, 4, and 5 air flows from the hose of the head 1 in the direction shown by the arrow through an air port 20 formed in the side and head of the cylinder 3, through a port 21 traversing the plug 9, see Fig. 5 and through a port 22 formed in the other side of the head $10^b$ and of the cylinder 3 to the underside of the head 7 of the piston. The air also passes from the port 20 to a port 19, see Figs. 4 and 5 to the underside of the trunk 6, the piston being thereby forced outward and lifted from its seat 17 allowing free passage of air through the couplings and the train pipe. Communication to the atmosphere from the other side of the piston is provided through ports 23 and 24 see Figs. 2 and 5. When the piston 5 is open, the head 7 seats itself upon the ring 28, which projects into the cylinder for that purpose. At this time the plug is in such a position relatively to the cylinder that the ports are open, as shown in Figs. 1, 4 and 5.

Figure 6:
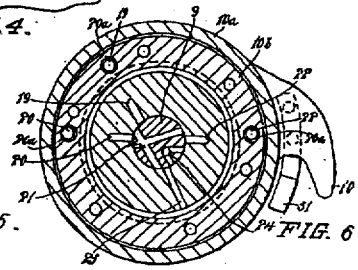

In Figs. 6 the plug is shown in the position it occupies to close all the ports the couplings being in the position shown by the dotted lines "Y" Fig. 3.

Figure 7:
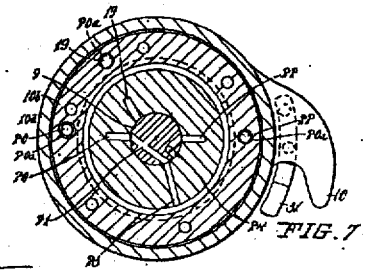

In Fig. 7 the position of the plug allows air to flow through the ports 20, 21 and 23, see Fig. 2 to the space between the head $10^b$ of the cylinder and the head 7 of the piston. At the same time air is allowed to escape from the other side of the head 7 to the atmosphere through the ports 22 and 24 see Figs. 2 and 7. The piston will then close upon its seat 17 under the air pressure thus preventing the passage of air through the couplings.

When the couplings are disengaged, the plug is in the position shown in Fig. 3, in which position air flows through the ports 20, 21 and 23, see Fig. 2, to the spaces between the head of the cylinders and the heads of the pistons, the ports 22 being closed.

Figure 8:
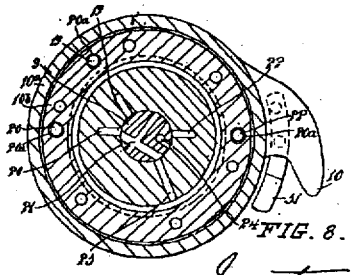

When the members of the coupling are being properly, manually disengaged the plugs will be turned first into the position shown in Fig. 7 to effect a closing of the pistons upon the seat 17, and then by slight further rotation into the position shown in Fig. 8, in which the exhaust ports 22 are closed so that the pressure of air in each train pipe section will maintain the piston in its closed position, as shown in Fig. 2.

When coupling the heads, that is in turning them from the position shown by dotted lines X in Fig. 3 into the position shown in full lines, the pins 29 on each head engage with the corresponding handles 10 and turn the plugs into position shown in Figs. 1 and 5 whereby the pistons are brought into the open position and air is allowed to flow through the couplings. A spring catch 31 fixed to the handle 10 engages the pin 29 to prevent the handle 10 from moving until released by hand from the said spring catch. When the heads are afterward turned back into the position shown in dotted lines the spring catches 31 cause the handles 10 to be moved by the pins 29 back to the position corresponding to the position of the plug shown in Fig. 8 whereby the pistons are closed. In case of the couplings being in their ordinary running position as shown in Figs. 1 and 5 and then being improperly disconnected or dragged apart by the separation of the carriages of the train, the pistons 5 and plugs 9 are retained in the position shown in Figs. 1 and 5, allowing air to escape from the train pipe and apply the brakes.

The cap $10^a$ has a recess 33 in its rim and a pin 34 projecting radially into the said recess prevents the cap from exceeding the limits of its required maximum rotation in each direction.

What we do claim and desire to secure by Letters Patent of the United States is:—

1. The herein described air brake pipe coupling comprising two heads each including a lateral cylindrical extension, a piston reciprocable in said extension and adapted to close the air passage through the head, a rotatable plug mounted in each head and provided with ports adapted respectively to connect spaces on opposite sides of the piston with the pressure side of the air passage in the head and with the atmosphere, and means for automatically rotating said plug as the heads are coupled to render said ports therein operative.

2. The herein described air brake pipe coupling comprising two heads each including a lateral cylindrical extension, a piston reciprocable in said extension and adapted to close the air passage through the head, a rotatable plug mounted in each head, in alinement with the piston and provided with ports adapted respectively to connect spaces on opposite sides of the piston with the pressure side of the air passage in the head and with the atmosphere, a handle for rotating the plug to close said ports and means for automatically actuating the handle to rotate the plug and render said ports therein operative as the heads are coupled.

3. The herein described air brake pipe coupling comprising two heads each including a lateral cylindrical extension, a piston reciprocable in said extension and adapted to close the air passage through the head, a rotatable plug mounted in each head and provided with ports adapted respectively to connect spaces on opposite sides of the piston with the pressure side of the air passage in the head and with the atmosphere, a handle for rotating the plug to close said port, a pin on each head adapted to actuate the handle on the other to rotate the plug and render said ports operative as the heads are coupled, and means for locking said pin and handle together.

FRANCIS ROBERTS.
VERNON JOHN ROBERTS.

Witnesses:
C. S. Brown,
M. C. Bender.

Copies of this patent may be obtained for five cents each, by addressing the "Commissioner of Patents, Washington, D. C."